United States Patent Office
3,274,150
Patented Sept. 20, 1966

3,274,150
POLYAMIDES STABILIZED WITH ALKALI METAL IODIDES IN COMBINATION WITH PHENYLENE DIAMINES OR A BIS PHENOL
Melvin Myron Baevsky, Wilmington, Del., assignor to E. I. du Pont de Nemours and Company, Wilmington, Del., a corporation of Delaware
No Drawing. Filed Oct. 24, 1962, Ser. No. 232,875
3 Claims. (Cl. 260—45.9)

This invention relates to the stabilization of synthetic linear polyamides against degradation at elevated temperatures and is a continuation-in-part of my copending application Serial No. 35,436, filed June 13, 1960, and now abandoned.

Synthetic linear polyamides are well known for their outstanding properties in many end uses such as in textile fibers and molded articles of various types. In recent years, melt spun polyamide yarns have also come into widespread use in the reinforcement of pneumatic tires for automobiles and other vehicles. In this, as well as in other end uses such as electrical insulation, polyamides are often subjected to high temperatures for extended periods of time. Under such conditions, the polyamide tends to lose strength and become brittle unless a suitable stabilizing agent is added.

Another problem which is encountered in the use of polyamide yarns for reinforcement of pneumatic tires or other rubber structures is that of obtaining adequate adhesion between the polyamide structure and the rubber. Various finishes have been applied to polyamide yarns to improve adhesion but the results have not been entirely satisfactory.

It is an object of this invention to improve the stability of polyamides exposed to elevated temperatures.

Another object of the invention is to provide a polyamide stabilizer which also contributes to improved adhesion of the polyamide to rubber in reinforced rubber structures.

The above objects are accomplished by incorporating in a synthetic linear polyamide a stabilizer composition comprising an organic antioxidant for rubber which has a boiling point above 270° C. and an inorganic antioxidant selected from the group consisting of sodium and potassium iodide. The organic antioxidant and the inorganic iodide should each be present in a concentration of from 0.1 to 5% by weight of the polyamide.

*Examples I–V*

To 71.1 lbs. of an aqueous solution containing 48.9% of hexamethylene diammonium adipate is added 25.1 grams of a 25.2% aqueous acetic acid solution and sufficient anhydrous potassium iodide to give the 0.5% concentration indicated in Example I. The salt solution is then concentrated at 136° C. and 13 p.s.i. until the salt concentration reaches 75% by weight of the solution. The salt solution is then pumped into an autoclave where the pressure is increased to 250 p.s.i. and the temperature to 220° C. After holding for 33 minutes under these conditions, 4,4'-butylidene-bis-6-tertiary butyl-m-cresol in a 20% solution in ethanol is injected in sufficient quantity to give a 0.5% antioxidant concentration (Example I). The temperature is then increased to 240° C. over a period of one hour. The pressure is then gradually reduced to atmospheric over a period of 90 minutes while the temperature increases to 270° C. After holding at 270° C. for an additional 30 minutes the molten polymer is extruded under 90 lbs. nitrogen pressure in the form of a ribbon upon a casting wheel and the ribbon is quenched by cooling with water. The ribbon is subsequently cut into flake. The technique of casting, quenching and cutting to flake is taught in Example I of U.S. Patent No. 2,289,774.

The polyhexamethylene adipamide flake was melt spun to form 840 denier, 140 filament yarn and cold drawn at a ratio of 5.4 in the conventional manner. Samples of the yarn were placed in a forced air oven at 180° C. for varying periods of time and the tensile properties of the heat-aged yarns determined. The percent tenacity retained was calculated and is shown in Table I.

In addition to the preparation which has been described, the same procedure was followed in Examples II–V which have also been reported. For purposes of comparison, the additive was varied in these further examples. In each instance, the concentration shown is based on the weight of the final polymer.

The various antioxidants employed have been identified in the table as follows:

Antioxidant A—4,4'-butylidene-bis - 6 - tertiary butyl-m-cresol
Antioxidant B—N - isopropyl-N'-phenyl-p-phenylene-diamine
Antioxidant C—N,N'-naphthyl-p-phenylenediamine
Antioxidant D—N - cyclohexyl-N' - phenyl-p-phenylene-diamine
Antioxidant E—2,2'-methylene-bis(4-ethyl-6-tertiary butyl phenol).

TABLE I

| Antioxidants Added | Tenacity Retained, Percent | | |
|---|---|---|---|
| | 2 hrs. | 4 hrs. | 8 hrs. |
| None | 71 | 58 | 47 |
| 1% potassium iodide (KI) | 76 | 74 | 62 |
| 1% antioxidant A | 71 | 57 | 28 |
| 0.5% antioxidant A+0.5% KI (I) | 95 | 91 | 80 |
| 1% antioxidant B | 69 | 53 | 39 |
| 0.5% antioxidant B+0.5% KI (II) | 91 | 86 | 78 |
| 1% antioxidant C | 85 | 79 | 73 |
| 0.5% antioxidant C+0.5% KI (III) | 99 | 88 | 81 |
| 1% antioxidant D | 35 | 33 | 29 |
| 0.5% antioxidant D+0.5% KI (IV) | 85 | 76 | 75 |
| 1% antioxidant E | 69 | 45 | 22 |
| 1% antioxidant E+0.5% KI (V) | 90 | 80 | 74 |

When yarns containing potassium iodide and an organic antioxidant, as recorded in the above table, are twisted into two ply cords and embedded in rubber in the conventional manner, adhesion of the cord to the rubber is found to be improved over that of yarns containing only inorganic or organo-metallic antioxidants. These improved results may be attributed to the use of an organic antioxidant for rubber which antioxidant has a boiling point above 270° C. The boiling point should also be above the melting point of the particular polyamide system. The preferred organic antioxidants are those which have been exemplified above.

*Example VI*

Polymer is prepared substantially as in the previous examples except that a 50 lb. capacity autoclave is employed. Sufficient amounts of antioxidant A and sodium iodide are added to give the concentrations shown in Table II below. The polymer, having a relative viscosity of 41.2, is extruded, quenched and cold drawn at a ratio of 5.2 to form 840 denier yarn. The yarn is exposed to air in an oven at 180° C. and the breaking strength determined after various periods of exposure. Results of these tests are shown in Table II. For comparison, results obtained with no additive and with sodium iodide alone are shown.

TABLE II

| Antioxidant Added | Tenacity Retained, Percent | | |
|---|---|---|---|
| | 2 hrs. | 4 hrs. | 8 hrs. |
| None | 67 | 55 | 44 |
| 0.3% sodium iodide (NaI) | 75 | 68 | 59 |
| 0.5% antioxidant A+0.3% NaI | 93 | 89 | 74 |

As shown in the foregoing examples, the addition of only the organic antioxidant results in little or no improvement in stability and in fact the reverse appears to be true in most instances. Surprisingly, however, when the iodide is also added the stability of the polymer, as judged by tenacity, is greatly improved, the improvement being substantially greater than realized with the iodide alone.

In the examples, the iodide and the organic antioxidant were added separately for purposes of convenience, i.e., the iodide can be added at an early stage in the polymerization since it is water soluble. The two stabilizers may be incorporated simultaneously as a mixture or in solution and for that reason may be referred to as a stabilizer composition.

For effective results, at least 0.1% of the iodide and 0.1% of the organic antioxidant must be employed and preferably at least 0.25% of each is used. Amounts in excess of 5% of either material should be avoided, since larger amounts adversely affect the spinnability of the polyamide. Preferably, no more than 1% of each component is used.

The stabilized fibers of this invention may be prepared from any polyamides such as, for example, those derivable from polymerizable mono-amino-carboxylic acids or their amide-forming derivatives and those derived from the reaction of diamines with dicarboxylic acids or their amide-forming derivatives. In addition to those set forth in the examples, other suitable polyamides are those prepared from the polymers disclosed in U.S. Patents 2,071,253, 2,130,523 and 2,130,948. Interpolyamides prepared from mixtures of diamines, dibasic acids and amino acids can also be used for the practice of this invention. Likewise, melt blends of two or more polyamides can be used if desired. In general, the range of polyamides which may be heat stabilized and which are adapted for use as reinforcement material is well known. It is apparent that a particular polyamide may be selected without departing from the spirit of the present invention which is therefore intended to be limited only by the scope of the appended claims.

Having thus described the invention, what is claimed as new and desired to be secured by Letters Patent is:

1. A composition of matter comprising a polyamide containing from 0.1–5% by weight of an inorganic antioxidant selected from the group consisting of sodium and potassium iodide and from 0.1–5% by weight of an organic antioxidant for rubber, said antioxidant having a boiling point above 270° C. and being selected from the group consisting of 4,4'-butylidene-bis-6-tertiary butyl-m-cresol, N-isopropyl-N'-phenyl-p-phenylenediamine, N,N'-naphthyl-p-phenylenediamine, N-cyclohexyl-N'-phenyl-p-phenylenediamine and 2,2'-methylene-bis(4-ethyl-6-tertiary butyl phenol).

2. A shaped article comprising a polyamide stabilized by the addition of 0.1–5% by weight of an inorganic antioxidant selected from the group consisting of sodium and potassium iodide and 0.1–5% by weight of an organic antioxidant for rubber, said antioxidant having a boiling point above 270° C. and being selected from the group consisting of 4,4'-butylidene-bis-6-tertiary butyl-m-cresol, N-isopropyl-N'-phenyl-p-phenylenediamine, N,N'-naphthyl-p-phenylenediamine, N-cyclohexyl-N'-phenyl-p-phenylenediamine and 2,2'-methylene-bis(4-ethyl-6-tertiary butyl phenol).

3. A stabilizer composition for polyamides, said composition comprising an inorganic antioxidant selected from the group consisting of sodium and potassium iodide and an organic antioxidant for rubber, said antioxidant having a boiling point above 270° C. and being selected from the group consisting of 4,4'-butylidene-bis-6-tertiary butyl-m-cresol, N-isopropyl-N'-phenyl - p - phenylenediamine, N,N'-naphthyl-p-phenylenediamine, N-cyclohexyl-N'-phenyl-p-phenylenediamine and 2,2'-methylene-bis(4-ethyl-6-tertiary butyl phenol), said iodide being present in a ratio with said antioxidant of at least one to four and not greater than four to one.

References Cited by the Examiner

UNITED STATES PATENTS

| 2,630,421 | 3/1953 | Stamatoff | 260—45.9 |
| 2,705,227 | 3/1955 | Stamatoff | 260—45.7 |
| 2,747,978 | 5/1956 | Closson et al. | 260—45.9 |
| 2,930,774 | 3/1960 | Honnen | 260—45.9 |

FOREIGN PATENTS 1,220,968  1/1960  France.

LEON J. BERCOVITZ, *Primary Examiner.*

H. E. TAYLOR, Jr., *Assistant Examiner.*